United States Patent [19]

Schmid et al.

[11] Patent Number: 5,069,817

[45] Date of Patent: * Dec. 3, 1991

[54] PROCESS FOR MAKING POLYOXYETHYLENE SURFACTANTS WITH DESIRABLE LOW TEMPERATURE BEHAVIOR

[75] Inventors: Karl Schmid, Mettmann; Alfred Meffert, Monheim; Klaus Friedrich, Duesseldorf; Michael Langen, Hilden; Klaus Herrmann, Monheim, all of Fed. Rep. of Germany

[73] Assignee: Henkel Kommanditgesellschaft auf Aktien, Duesseldorf, Fed. Rep. of Germany

[*] Notice: The portion of the term of this patent subsequent to Dec. 11, 2007 has been disclaimed.

[21] Appl. No.: 301,423

[22] Filed: Jan. 25, 1989

[30] Foreign Application Priority Data

Jan. 25, 1988 [DE] Fed. Rep. of Germany ....... 3802027

[51] Int. Cl.$^5$ ..................... B01F 17/42; C07C 41/03; C07C 41/34
[52] U.S. Cl. .................................... 252/351; 568/608; 568/616; 568/618; 568/621; 210/778; 252/DIG. 1
[58] Field of Search ............... 568/618, 621, 608, 616; 210/778; 252/DIG. 1, 351

[56] References Cited

U.S. PATENT DOCUMENTS

| | | | |
|---|---|---|---|
| 2,330,211 | 3/1940 | Haney | 210/778 |
| 3,016,404 | 1/1962 | Beauchamp et al. | 568/621 |
| 3,360,474 | 12/1967 | Cooley et al. | 210/778 X |
| 3,905,910 | 9/1975 | Coombs et al. | 210/778 X |
| 4,129,718 | 12/1978 | Muzzio | 568/621 X |
| 4,306,943 | 12/1981 | Mori et al. | 568/621 X |
| 4,456,773 | 6/1984 | Fock | 568/616 X |
| 4,507,475 | 3/1985 | Straehle et al. | 568/618 |
| 4,528,364 | 7/1985 | Prier | 568/621 X |
| 4,967,017 | 10/1990 | Schmid et al. | 568/521 |

FOREIGN PATENT DOCUMENTS 691078 7/1964 Canada .................................. 252/351

OTHER PUBLICATIONS

Foust, Alan S. et al., Principles of Unit Operation, (John Wiley & Son, New York, 1980), p. 516, 665–666.

Primary Examiner—Richard D. Lovering
Assistant Examiner—Daniel S. Metzmaier
Attorney, Agent, or Firm—Ernest G. Szoke; Wayne C. Jaeschke; Norvell E. Wisdom, Jr.

[57] ABSTRACT

A process for the production of alkyl polyoxyethylenes showing improved low-temperature behavior, by reaction of alcohols with ethylene oxide at elevated temperature in the presence of basic alkali metal compounds as catalysts and subsequent neutralization of the alkaline catalyst with acids, which under prior art practice was impractical because of clogging of reaction vessels and equipment associated with precipitation of salts during neutralization, is made practical by adding a finely divided solid to serve as a precipitation control agent during neutralization. The finely divided solids used are, in particular, organic and/or inorganic materials known in the prior art as filter aids, such as kieselguhr and sawdust or other finely divided cellulose.

20 Claims, No Drawings

PROCESS FOR MAKING POLYOXYETHYLENE SURFACTANTS WITH DESIRABLE LOW TEMPERATURE BEHAVIOR

FIELD OF THE INVENTION

This invention relates to processes for making polyoxyethylene surfactants by condensation of relatively long chain alcohols with ethylene oxide, in the presence of alkaline catalysts, and in particular is related to an improvement in the process of neutralizing the catalyst after condensation is complete, so as to make practical the use of quantities of catalyst that will give a distribution of product molecular weights with good resistance to solidification and/or phase separation at low temperatures.

DESCRIPTION OF RELATED ART

Surface-active alkyl polyoxyethylenes obtained by reaction of relatively long-chain alcohols with ethylene oxide have been known for decades. They are important representatives of the class of nonionic surfactants. The ethoxylation reaction is carried out at elevated temperature and pressure in the presence of acidic or basic catalysts, the use of basic compounds of the alkali metals having acquired particular significance in this regard. The most important basic catalysts are sodium and/or potassium alkoxylates, such as sodium and potassium methylate or sodium and potassium ethylate. Other basic catalysts often used are sodium and potassium hydroxide.

Alkyl or alkylaryl ethoxylates produced with alkaline catalysts have to be neutralized to pH values of from 6.5 to 7.5 after production, because otherwise they would undergo serious discoloration in the presence of atmospheric oxygen. Ethoxylates based on unsaturated fatty alcohols, for example on oleyl alcohol, are particularly sensitive in this regard. Neutralization of the catalyst in the reaction product is carried out with organic and/or inorganic acids, for example with gluconic acid, glycolic acid, acetic acid, formic acid, benzoic acid, lactic acid, oxalic acid, citric acid, propionic acid, phosphoric acid, methanesulfonic acid and/or diglycolic acid. Highly corrosive acids, such as sulfuric acid or hydrochloric acid, are rarely if ever used.

During the neutralization reaction, the acids added react with the potassium or sodium alkoxylate present in the ethoxylate to form the corresponding salt. These salts have only limited solubility in the reaction product. If the quantity of catalyst used for commercial production of the ethoxylate is so large that solubility of the salts during the neutralization reaction is not guaranteed, first clouding and then, to an increasing extent, precipitations of salt occur in the reaction product. In practice, therefore, the quantity of catalyst used has hitherto been specified in such a way that the salt formed with the quantity of acid required for neutralization is still just soluble in the ethoxylate reaction product. A quantity of about 0.5% by weight of sodium methylate, based on the total quantity of alcohol and ethylene oxide, or stoichiometrically corresponding quantities of other basic alkali metal compounds may be regarded as the practical limit in this regard. If the quantity of catalyst is increased beyond that limit, neutralization with the acids mentioned is accompanied by the formation of a salt which precipitates from the ethoxylate in the form of a viscous, tacky mass and is deposited in the neutralization vessel on the stirrer and on the vessel walls and also in the pipes through which the ethoxylate passes to the filtration stage. Accordingly, all the inner regions of the apparatus and pipes involved soon become so heavily clogged that the process cycle has to be interrupted. Expensive and time-consuming cleaning measures are necessary. The work which this involves is so considerable that the reaction products are no longer of any commercial interest.

Accordingly, it is not surprising that, hitherto, working with the quantities — limited as explained above — of basic alkali compounds as catalysts has dominated the production of the ethoxylation products.

There is today a broad range of nonionic surfactants based on linear and/or branched, saturated and/or unsaturated alcohols including, for example, corresponding ethoxylates of linear fatty alcohols, oxoalcohols (mixtures of linear and branched alcohols), alcohols made by the Ziegler process (linear structure), secondary alcohols from the oxidation of paraffins and also alkyl aryl alcohols, of which nonyl phenol has hitherto been the most important starting alcohol of this type in practice.

Nonionic surfactants are used for a wide variety of applications ranging, for example, from detergents, softeners, textile auxiliaries, and cosmetic products to industrial formulations in which nonionic surfactants act mainly as emulsifiers.

The majority of industrial formulations are liquid products which, for practical reasons, are required to show good low-temperature stability. Accordingly, it is no surprise that nonlyphenol ethoxylates have been preferred for formulating such products over the past 30 years. These products are distinguished by better low-temperature behavior than ethoxylates based on non-aromatic alcohols having the same carbon chain lengths for the same hydrophilicity and cloud point. Their better low-temperature behavior is characterized in particular by a lower solidification point, a lower low-temperature cloud point and a lower low-temperature clear point. For example, nonylphenol +9 moles of ethylene oxide (hereinafter usually abbreviated as "EO") has a solidification point of +6° C. whereas a $C_{12}/C_{14}$ fatty alcohol +9 EO has a solidification point of approximately +27° C.

Although, in the interests of simplicity, the ethoxylate reaction products formed during the alcohol ethoxylation reaction are stoichiometrically described by their chemical formulas, for example in the above manner of $C_{12}/C_{14}$ fatty alcohol +9 EO, the reaction product is in reality a mixture of homologous ethoxylates having a comparatively low to high degree of ethoxylation. The particular homolog distribution is determined by the structure of the alcohol used and the ethoxylation conditions. The type and quantity of catalyst used plays an important role in this regard. Important practical properties, such as wetting power, washing power, cleaning power, emulsifying power, foam inhibition and the like, are determined by the particular homolog distribution of the reaction products. The commercial products now available on the market have an optimized performance level in this regard which should be taken as the basic standard practical performance level for any modifications in the homolog distribution of corresponding reaction products and, as far as is consistent with other practical requirements, should not be changed.

Alkyl polyoxyethylenes of the type in question here are attended by one particular difficulty: Where alcohols containing non-aromatic constituents are used as starting reactants, reaction products of predetermined average stoichiometry, which are of particular practical interest, often include reaction products present partially or completely in the solid phase at room temperature or even slightly above room temperature. Even if considerable proportions of the homologs present in the reaction product are liquid at room temperature, relatively small quantities of homologs which are insoluble at the same temperature can lead to partial or even to complete gelation or solidification of the reaction product. This is an undesirable phenomenon. Practical use is understandably made much easier with nonionics of the type in question here when all components are present in free-flowing mixtures and, most preferably, in one clear liquid phase at the usual working temperatures, particularly in the vicinity of ambient temperature.

The prior art has concerned itself at length with the production of alkyl polyoxyethylene reaction products of narrower homolog distribution. It is known that narrow homolog distributions can be established by the choice of suitable catalysts and, in particular, by the use of alkaline earth metal catalysts. Moreover, it is also known that, where basic alkali metal compounds are used as catalysts, as desired in practice, the homolog distribution can be narrowed down by using these catalysts in large quantities. Homolog distributions narrowed in this way generally result in a reduction in the measured temperatures, such as low temperature cloud point and the like, that characterize the low-temperature behavior of the products, as a result of reduction of the percentage of higher homologs. There are different observations in the relevant prior art on the corresponding effect on the practical properties, e.g., wetting and emulsifying power. In some cases, unwanted changes are postulated while, in others, there are said to be no major changes.

An object of the present invention is to provide alkyl and/or alkenyl polyoxyethylene reaction mixtures with practical properties that entirely satisfy the standards currently being set in the art. At the same time, however, the invention seeks considerably to improve the low-temperature behavior of the reaction mixtures in relation to comparable standard products. This means that improved liquid characteristics and, most preferably, the clear liquid state is to be achieved, particularly for suitable reaction products which are liquid in the vicinity of room temperature or only slightly higher.

In achieving this object, the invention seeks intentionally to continue using the basic alkali metal compounds which have been successfully used in practice as catalysts. Through an increase — known per se — in the concentration of catalyst for the alcohol ethoxylation reaction, the invention seeks to obtain a substantial improvement in the low-temperature behavior of the reaction product without any significant change in its practical performance properties.

In background work which has been carried out to put this principle into practice, it has been found that a major difficulty arises in terms of process technology. In the process according to the invention, the quantity in which the basic alkali metal catalyst is present during the ethoxylation reaction is increased in a known manner to narrow the homolog distribution and, in particular, to eliminate troublesome components within the range of the higher and highest ethoxylate products. When the homolog distribution is lowered in this way, the low temperature parameters, such as the low temperature cloud point, low temperature clear point, and solidification point, are lowered and the low-temperature behavior as a whole improved. This improvement is predominantly due to a reduction in the percentage of higher homologs. The increased amount of catalyst, however, brings the amount above the practical limit established by the prior art, in order to avoid clogging the reactor vessels and equipment. It is therefore a further object of the invention to provide reaction products showing improved low-temperature stability, with no deterioration in their other useful properties, by a process which is easy to carry out on an industrial scale.

DESCRIPTION OF THE INVENTION

The solution to the problem which the invention addresses is based on the surprising discovery that, by increasing the quantity of basic alkali metal catalysts to a limited extent, it is possible to obtain substantial improvements in the low temperature characteristics of the product without undesirably impairing the performance properties, such as washing or wetting power, emulsifying power and the like. According to the teaching of the invention, however, the quantity of basic catalyst has to be increased beyond the limit which characterizes the solubility of the salt formed by neutralization in the ethoxylation product. In the process according to the invention, this problem is overcome by neutralization of the catalyst in the presence of finely divided solids homogeneously distributed throughout the reaction mixture.

Except in the operating and comparative examples, or where otherwise explicitly indicated, all numerical quantities in this description specifying quantities of materials or reaction conditions are to be understood as modified by the word "about".

The processes according to the invention are for the production of alkyl and/or alkenyl polyoxyethylenes showing improved low-temperature behavior by reaction of saturated and/or unsaturated, straight-chain and/or branched alcohols with ethylene oxide at elevated temperature in the presence of basic alkali metal compounds as catalysts and subsequent neutralization of the of the alkaline catalyst with organic and/or inorganic acids. The process according to the invention is characterized by use of such a high concentrations of catalyst that a salt is precipitated in the form of an undissolved solid phase during the neutralization step and by carrying out the neutralization step in such a way that the salt phase is precipitated in the presence of finely divided solids dispersed in the reaction product. It has surprisingly been found that incrustations on inner parts of apparatus and/or pipes can be completely prevented by this measure and that, in addition, the reaction product may be filtered without difficulty by conventional methods. According to the invention, therefore, the production of alkyl and/or alkenyl polyoxyethylenes is possible in accordance with the objects of the invention as stated above without any loss of advantages in terms of process technology or product performance.

According to the invention, inorganic and/or organic materials conventionally used as filter aids are preferably used as the finely divided solids to promote controllable precipitation of insoluble salts during neutralization. These precipitation control agents are dispersed in the reaction mixture from the alkyoxylation step before the salt phase in the process of formation begins to crystallize out. In the most preferred embodiment, the precipitation control agents are finely dispersed in the reaction product before addition of the acid is commenced.

Both inorganic materials, particularly kieselguhr, and known organic filter aids are suitable, as precipitation control agents. Organic materials may be, for example, sawdust and/or finely divided cellulose. Suitable precipitation control agents of this organic type are known, for example, under their protected trade names of "Arbocel" and "Lignocell".

One advantage of using organic precipitation control agents is that they can be burned away together with the salt (for example sodium gluconate) obtained from the ethoxylate whereas inorganic precipitation control agents contaminated by these salts would have to be disposed of by other means such as landfills. However, it can be advantageous to use mixtures of organic and inorganic precipitation control agents, in which case ratios between the two types from 3:1 to 1:3 are particularly preferable.

The quantity of precipitation control agent for salt formation is preferably in the range from about 0.3 to 2% by weight and more preferably in the range from about 0.5 to 1% by weight, based on the quantity of ethoxylate formed as reaction product.

The process according to the invention may be carried out, for example, as follows:

The reaction product containing the comparatively large quantity of catalyst, which on completion of the reaction has a temperature of from 170° to 180° C., as known per se, is transferred from the pressure vessel to a stirrer-equipped neutralization vessel on completion of the ethoxylation step. In the neutralization vessel, the reaction mixture is cooled with stirring to a temperature in the range from about 50° to 110° C. and preferably in the range from about 80° to 100° C. and the precipitation control agent is added to the product and homogeneously dispersed therein. Neutralization is then carried out with the selected acid. On completion of neutralization, the ethoxylate in which the precipitation control agent and the salt formed are homogeneously dispersed is pumped to the filtration stage. Filtration may take place both using flow through filters (filter thimbles, Seitz filters and the like) or using filter presses and rotary filters. Ethoxylates of particularly low salt content are obtained when the filtration step, which takes place in a nitrogen atmosphere, is carried out at temperatures above 80° C.

If this process of neutralization and filtration is adopted, no viscous and tacky residues of salt can be found either in the neutralization vessel on the walls or on the stirrer or in the pipes or pumps.

In one particular embodiment of the process according to the invention, the ethoxylate reaction product is first only partially neutralized, for example to a pH value of approximately 8, by addition of acid to the neutralization vessel — with the precipitation control agent homogeneously dispersed therein. The reaction product is then bleached, preferably by addition of hydrogen peroxide, for example in quantities of from 0.1 to 1% by weight, based on the ethoxylate. Only after the bleaching step is the neutralization reaction completed by addition of further quantities of acid to establish a pH value in the range from about 6.5 to 7.5. The ethoxylate is then filtered.

The quantity of basic alkali metal compounds used as catalyst in the process according to the invention is higher than has hitherto been regarded as advisable in practice. The quantities of catalyst are normally above the limit of approximately 0.5% by weight, expressed as sodium methylate and based on the total weight of alcohol and ethylene oxide used, that has been recognized in the prior art. If other alkaline catalysts are used, i.e. for example potassium alcoholate or sodium or potassium hydroxide, stoichiometrically equivalent quantitative ratios of the catalyst are selected.

The structure of the alcohol used is also an important factor in ascertaining the particular quantity of catalyst to be used. Alcohols containing a sterically unhindered hydroxyl group, i.e. in particular linear alcohols of the fatty alcohol or Ziegler alcohol type, or even branched alcohols containing a sterically unhindered primary hydroxyl group typically require quantities of sodium methylate catalyst of from about 0.5 to 1.5% by weight and preferably from about 0.8 to 1.1% by weight, based in each case on the total quantity of alcohol and ethylene oxide used, to obtain the desired result according to the invention of increased low-temperature stability for the same performance properties.

Where sterically hindered fatty alcohols, for example such compounds as 2-hexyl-1-decanol or 2-octyl-1-dodecanol, are ethoxylated, the quantity of catalyst required is typically in the range from about 1.4 to 1.8% by weight sodium methylate, again based on the total quantity of alcohol used and ethylene oxide.

The use of such large quantities of catalyst and the application of the above-described technical solution to the problem of removing the sticky reaction salts inevitably formed as a result from the neutralization stage combine to give ethoxylates which show considerably better low-temperature behavior than the products produced by the process hitherto applied in practice using a smaller quantity of catalyst with no deterioration — in some cases even with an improvement — in the other properties of practical significance, such as washing power, detergent power and emulsifying power. This improvement is particularly important for convenient handling of nonionics of the type described herein which, when produced by conventional processes, are completely or partially thickened or tend to form solid components, particularly on standing below room temperature. According to the invention, it is possible to improve the low-temperature behavior of these mixtures to such an extent that mixtures of homologs that are entirely liquid and preferably clear at room temperature are obtained. Low temperature behavior may be measured in a known manner by determination of the low-temperature cloud point (according to DIN ISO 3015), the solidification point (according to DIN ISO 3016), and the low-temperature clear point. In the following Examples, the low-temperature clear point was determined as follows: A sample of 100 g of the product to be tested, into which a thermometer had been inserted, were cooled to minus 40° C. to assure that the sample was entirely solid. The sample was then left to rise to room temperature and the temperature at which the product just became a clear liquid was determined and recorded as the low-temperature clear point. The cloud point and the cloud temperature of the ethyoxylates made in the examples were determined in accordance with DIN 53 917.

Examples

The practice of the invention may be further appreciated from the following non-limiting operating Examples and Comparison Examples, in which all the ethoxylates were prepared as follows: The quantities of fatty alcohol, ethylene oxide and catalyst shown under each example were reacted in an autoclave for about 3 to 4 hours at 170° to 180° C. under a reaction pressure of 2 to at most 5 bars. After the reaction product had been transferred under nitrogen to a stirrer-equipped neutralization vessel, 1% by weight commercial grade. kieselguhr was homogeneously dispersed by stirring it into the product, cooled to approximately 90.C. The ethoxylate reaction product was then neutralized with lactic acid so that it has a final pH value (measured in a solution of 1% ethoxylate in 99% deionized water) of 6.5 to 7.5. All percentages noted in the Examples are percent by weight unless otherwise stated.

COMPARISON EXAMPLE 1

598.4 g 2-octyl-1-dodecanol, hydroxyl value 172.5, were reacted with 401.6 g ethylene oxide and 7.0 g sodium methylate, 30% in methanol (corresponds to 0.2% by weight sodium methylate, based on the total quantity of alcohol and ethylene oxide). A pasty ethoxylate having the following characteristic values was obtained:

| OH value | 111.7 |
| --- | --- |
| % H$_2$O | 0.08 |
| Density (70° C.) | 0.8979 g/cm$^3$ |
| Cloud temperature (measured with 5 g of ethoxylate dissolved in 25 g of a mixture of 25% butyl diglycol + 75% water) | 38.2° C. |
| pH value (1%) | 7.1 |
| % Poly(ethylene oxide) | 5.5, molecular weight 1600 |
| Low-temperature clear point | >50° C. |
| Solidification point | 25° C. |
| Low temperature cloud point | 50° C. |

EXAMPLE 1

596.4 g 2-octyl-1-dodecanol, hydroxyl value 172.5, were reacted with 403.g ethylene oxide and 60.0 g sodium methylate, 30% in methanol (corresponds to 1.8% by weight sodium methylate, based on the total quantity of alcohol 35 and ethylene oxide). An ethoxylate in the form of a clear liquid at room temperature was obtained and had the following characteristic values:

| OH value | 108.7 |
| --- | --- |
| % H$_2$O | 0.08 |
| Density (70° C.) | 0.8990 g/cm$^3$ |
| Cloud temperature (measured with 5 g of ethoxylate dissolved in 25 g of a mixture of 25% butyl diglycol + 75% water) | 44.1° C. |
| pH value (1%) | 6.5 |
| % Poly(ethylene oxide) | 1.2, molecular weight 600 |
| Low-temperature clear point | 25° C. |
| Solidification point | 8° C. |
| Low temperature cloud point | 16° C. |

COMPARISON EXAMPLE 2

679.9 g oleyl alcohol, iodine value 72; hydroxyl value 212, were reacted with 520.0 g ethylene oxide and 3.6 g sodium methylate, 30% in mthanol (corresponds to 0.09% by weight sodium methylate, based on the total quantity of alcohol and ethylene oxide). An ethoxylate having the following characteristic values is obtained:

| OH value | 119.0 |
| --- | --- |
| % H$_2$O | 0.11 |
| Density (20° C.) | 0.952 g/cm$^3$ |
| Cloud temperature (measured with 5 g of ethoxylate dissolved in 25 g of a mixture of 25% butyl diglycol + 75% water) | 67.4° C. |
| pH value (1%) | 7.1 |
| % Poly(ethylene oxide) | 1.2, molecular weight 1000 |
| Low-temperature clear point | >30° C. |
| Solidification point | 10° C. |
| Low temperature cloud point | 21° C. |

EXAMPLE 2

667.3 g oleyl alcohol, iodine value 72; hydroxyl value 212, were reacted with 532.7 g ethylene oxide and 36.0 g sodium methylate, 30% in methanol (corresponds to 0.9% by weight sodium methylate, based on the total quantity of alcohol and ethylene oxide). An ethoxylate having the following characteristic values was obtained:

| OH value | 119.8 |
| --- | --- |
| % H$_2$O | 0.06 |
| Density (20° C.) | 0.951 g/cm$^3$ |
| Cloud temperature (measured with 5 g of ethoxylate dissolved in 25 g of a mixture of 25% butyl diglycol + 75% water) | 67.6° C. |
| pH value (1%) | 6.8 |
| % Poly(ethylene oxide) | 2.3, molecular weight 400 |
| Low-temperature clear point | 16° C. |
| Solidification point | 2° C. |
| Low temperature cloud point | 12° C. |

COMPARISON EXAMPLE 3

413.0 g of a mixture of octanol/decanol, hydroxyl value 330, were reacted with 587.0 g ethylene oxide and 7.0 g sodium methylate, 30% in methanol (corresponds to 0.21% by weight sodium methylate, based on the total quantity of alcohol and ethylene oxide). 9.4% of the unreacted octanol/decanol were distilled off the ethoxylate obtained. An ethoxylate having the following characteristic values was obtained:

| OH value | 127 |
| --- | --- |
| % H$_2$O | 0.11 |
| Density (70° C.) | 0.954 g/cm$^3$ |
| Cloud point (1% in water) | 48° C. |
| pH value (1%) | 7.2 |
| % Poly(ethylene oxide) | 4.2 |
| Low-temperature clear point | >25° C. |
| Solidification point | 10° C. |
| Low temperature cloud point | 16° C. |

EXAMPLE 3

550.7 g of a mixture of octanol/decanol, hydroxyl value 330, were reacted with 849.3 g ethylene oxide and 42.0 g sodium methylate, 30% in methanol (corresponds to 0.90% by weight sodium methylate, based on the total quantity of alcohols and ethylene oxide). 9.1% of the octanol/decanol mixture was distilled off from the ethoxylate obtained. An ethoxylate having the following characteristic values was obtained:

| | |
|---|---|
| OH value | 123 |
| % H$_2$O | 0.13 |
| Density (70° C.) | 0.958 g/cm$^3$ |
| Cloud point (1% in water) | 64° C. |
| pH value (1%) | 7.1 |
| % Poly(ethylene oxide) | 4.6 |
| Low-temperature clear point | 18° C. |
| Solidification point | 7° C. |
| Low-temperature cloud point | 10° C. |

What is claimed is:

1. A process for the production of alkyl, alkenyl, or mixed alkyl and alkenyl polyoxyethylenes comprising:
   (a) reacting alcohol molecules according to the general chemical formula R-OH wherein R is any alkyl or alkenyl group, with ethylene oxide in the presence of a basic alkali metal compound as catalyst, to produce a liquid phase containing R-polyoxyethylenes and said catalyst; and
   (b) neutralizing the basic catalyst by adding acid to the liquid phase containing the basic catalyst,
   wherein the improvement comprises the conditions that:
   (A) the amount of basic alkali metal catalyst used is sufficient that solid precipitate, including salt combining anions of the neutralizing acid with cations of the alkali metal compound catalyst, is formed during neutralization, the amount of said basic alkali metal catalyst being stoichiometrically equivalent to a specified mass of sodium methylate, said specified mass of sodium methylate being a mass that is the sum of (i) between about 0.8 and about 1.1% of the combined masses of any sterically unhindered alcohol reacted and of the ethylene oxide reacted therewith and (ii) between about 1.4 to about 1.8% of the combined masses of any sterically unhindered alcohol reacted and of the ethylene oxide reacted therewith;
   (B) finely divided solids are dispersed within the fluid phase containing the catalyst before any part of the neutralizing step in which said solid precipitate of part (A) is formed; and
   (C) the neutralized liquid phase is separated from any solids contained therein.

2. A process as claimed in claim 1, wherein the finely divided solids of part (B) are filter aids and are dispersed in the polyoxyethylene reaction product before neutralizing is begun.

3. A process as claimed in claim 2, wherein the finely divided solids of part (B) are selected from the group consisting of kieselguhr, sawdust, finely divided cellulose, and mixtures of there ingredients.

4. A process as claimed in claim 3, wherein the finely divided solids of part (B) are used in quantities of about 0.3 to about 2% by weight, based on the polyoxyethylene product formed.

5. A process as claimed in claim 4, wherein the finely divided solids of part (B) are used in quantities of about 0.5 to about 1% by weight, based on the polyoxyethylene product formed.

6. A process as claimed in claim 2, wherein the finely divided solids of part (B) are used in quantities of about 0.3 to about 2% by weight, based on the polyoxyethylene product formed.

7. A process as claimed in claim 6, wherein the finely divided solids of part (B) are used in quantities of about 0.5 to about 1% by weight, based on the polyoxyethylene product formed.

8. A process as claimed in claim 1, wherein the finely divided solids of part (B) are used in quantities of about 0.3 to about 2% by weight, based on the polyoxyethylene product formed.

9. A process as claimed in claim 8, wherein the finely divided solids of part (B) are used in quantities of about 0.5 to about 1% by weight, based on the polyoxyethylene product formed.

10. A process as claimed in claim 1, wherein neutralizing is performed in the presence of the finely divided solids of part (B) and is interrupted, bleaching by addition of hydrogen peroxide to the reaction mixture is then performed, and neutralizing is subsequently completed.

11. A process as claimed in claim 10, wherein the neutralizing is interrupted at a pH of about 8 and completed at a pH between about 6.5 and 7.5.

12. A process as claimed in claim 11, wherein the finely divided solids of part (B) are used in quantities of about 0.3 to about 2% by weight, based on the polyoxyethylene product formed.

13. A process as claimed in claim 12, wherein the finely divided solids of part (B) are used in quantities of about 0.5 to about 1% by weight, based on the polyoxyethylene product formed.

14. A process as claimed in claim 1, wherein a mixture of inorganic and organic material is used as the finely divided solids of part (B).

15. A process as claimed in claim 14, wherein the ratio of inorganic to organic material is between about 3:1 to about 1:3.

16. A process as claimed in claim 1, wherein neutralizing is carried out with precipitation of the salt phase on the surface of the dispersed finely divided solids of part (B) at a temperature in the range from about 50° to 110° C.

17. A process as claimed in claim 1, wherein alcohols containing at least about 8 carbon atoms are used.

18. A process as claimed in claim 17, wherein the alcohols used contain about 10 to about 36 C atoms.

19. A process as claimed in claim 18, wherein the finely divided solids of part (B) are used in quantities of about 0.3 to about 2% by weight, based on the polyoxyethylene product formed.

20. A process as claimed in claim 19, wherein the finely divided solids of part (B) are used in quantities of about 0.5 to about 1% by weight, based on the polyoxyethylene product formed.

* * * * *